(12) United States Patent
Vinayakray-Jani (10) Patent No.: US 7,362,731 B2
(45) Date of Patent: Apr. 22, 2008

(54) SELECTION OF NETWORK ACCESS ENTITY IN A COMMUNICATION SYSTEM

(75) Inventor: Preetida Vinayakray-Jani, Helsinki (FI)

(73) Assignee: Nokia Corporation, Espoo (FI)

( * ) Notice: Subject to any disclaimer, the term of this patent is extended or adjusted under 35 U.S.C. 154(b) by 682 days.

(21) Appl. No.: 10/839,717

(22) Filed: May 6, 2004

(65) Prior Publication Data

US 2004/0208144 A1    Oct. 21, 2004

(30) Foreign Application Priority Data

Mar. 23, 2004    (FI)    ................... 20040444

(51) Int. Cl.
*H04Q 7/00*    (2006.01)
*H04Q 7/20*    (2006.01)

(52) U.S. Cl. ............ 370/331; 370/310; 370/328; 370/338; 370/310.2; 455/435.2; 455/432.1; 455/436; 455/437; 455/438; 455/439; 455/442

(58) Field of Classification Search ........... 370/331, 370/332, 333, 277, 328, 338, 310, 310.2; 455/436, 437, 438, 439, 442, 432.1, 435.2
See application file for complete search history.

(56) References Cited

U.S. PATENT DOCUMENTS

| | | | | |
|---|---|---|---|---|
| 5,907,542 A | * | 5/1999 | Kuehnel et al. | ............. 370/331 |
| 6,192,245 B1 | * | 2/2001 | Jones et al. | .................. 455/437 |
| 6,195,551 B1 | * | 2/2001 | Kim et al. | .................. 455/436 |
| 6,246,875 B1 | * | 6/2001 | Seazholtz et al. | ........ 455/432.1 |
| 6,584,087 B1 | * | 6/2003 | Czaja et al. | ................ 370/335 |
| 2001/0021650 A1 | * | 9/2001 | Bilgic | ......................... 455/418 |
| 2002/0197992 A1 | * | 12/2002 | Nizri et al. | .................. 455/435 |
| 2004/0208144 A1 | | 10/2004 | Vinayakray-Jani | |

FOREIGN PATENT DOCUMENTS

WO    WO 01/76151 A2    10/2001

OTHER PUBLICATIONS

Paik, et al.; "*Prediction-Based Fast Handoff for Mobile WLANs[1]*" International Conference on Telecommunications, 2003, pp. 748-753.

* cited by examiner

*Primary Examiner*—George Eng
*Assistant Examiner*—Huy Phan
(74) *Attorney, Agent, or Firm*—Squire, Sanders & Dempsey, LLP (57) ABSTRACT

A mechanism for selecting a serving network access entity for a mobile node in a communication system including network access entities broadcasting periodic advertisement messages. The method utilizes a waiting period measured from a first reference moment. When no advertisement message is received within the waiting period from the network access entity being currently the serving network access entity for the mobile node, the node issues a router solicitation message and initiates a measurement of a solicitation period from a second reference moment. The mobile node further monitors whether a response to the router solicitation message is received from the network access entity within the solicitation period, and based on the monitoring step decides whether it remains connected to the said network access entity.

39 Claims, 3 Drawing Sheets

SELECTION OF NETWORK ACCESS ENTITY IN A COMMUNICATION SYSTEM

FIELD OF THE INVENTION

The present invention relates generally to implementation of hand-offs in a communication system. More particularly, the invention relates to selection of a network access entity in a communication system, especially in a Mobile IP (MIP) network. A network access entity here refers generally to an element providing connectivity between mobile nodes and network infrastructure.

BACKGROUND OF THE INVENTION

The protocols related to IP networks, such as the Internet, are developed by the Internet Engineering Task Force (IETF), which has been developing support for mobile IP nodes for both versions of IP (i.e. for IPv4 and IPv6). The main results of this work are the two Mobile IP protocols, Mobile IPv4 (RFC 2002) and Mobile IPv6 (work in progress, assumed to reach RFC status soon).

In both versions of Mobile IP, the packets sent to the so-called home address, which is the permanent address of the mobile node, are forwarded to the mobile node when it is not located at its home address. An element called a home agent is located on the link within which the home address of the mobile node is located, i.e. on the so-called home link. The home agent captures all IP packets sent to the home address of the mobile node while the mobile node is not located on the home link, and forwards them to the current IP address of the mobile node, called the care-of address. In Mobile IPv4, the forwarding process utilizes so-called IP-in-IP tunneling, in which encapsulated packets are forwarded to the mobile node. Thus the destination address in the outer IP header of this IP-in-IP tunneling is the care-of address, while the destination address in the inner IP header is the home address of the mobile node.

In Mobile IPv6, the mobile node signals a change in its care-of address to the home agent by sending to the home agent the new care-of address in a message called a Binding Update. The home agent acknowledges this message by returning to the mobile node a message called a Binding Acknowledgement. In Mobile IPv4, the corresponding messages are the Registration Request sent from the mobile node to the home agent and the Registration Reply sent in the opposite direction.

When a mobile node moves from one sub-network to another, a hand-off (also termed a handover) procedure takes place so that the mobile node can maintain connectivity during the movement. In order to detect the movement, mobile nodes typically rely on so-called agent advertisements broadcast by routers residing in the network. Each router multicasts agent advertisements periodically, whereby the mobile nodes may discover their neighboring routers, and thus also the care-of addresses available, simply by listening for the agent advertisements. However, if a mobile node wishes to obtain a care-of address immediately without waiting for a periodic agent advertisement, it may also broadcast or multicast a so-called agent solicitation message. The agent advertisements and agent solicitations are also commonly termed router advertisements and router solicitations, respectively.

The occurrence of a Mobile IP hand-off procedure is a consequence of a link layer hand-off procedure between two sub-networks. The overall hand-off process may be divided into three phases: the hand-off at the link layer, the detection of movement, and the above-mentioned registration of the new care-of address. The detection of movement here refers to the mechanism by which the mobile node detects that it has moved away from the coverage area of the access router it is still registered with. Although the Mobile IP hand-off is needed to maintain connectivity as a mobile node moves within the network, the impact of latency associated with the above phases is significant and may disrupt an on-going real-time service. Efficient solutions are thus needed for future wireless IP networks to reduce the overall hand-off latency.

As to the MIP protocols, the crucial components of the hand-off latency are thus the delay associated with the detection of movement and the delay associated with the registration of a new care-of address. The latter is mainly due to the end-to-end delay introduced by the registration messages and it may be reduced by so-called micro-mobility architectures in which local mobility gateways are utilized to manage mobility. In this way, the hand-offs may be divided into two categories: global hand-offs, in which a mobile node registers its care-of address with the home agent and local hand-offs, in which local mobility gateways handle mobility in a local network. When a mobile node associates itself for the first time with a local network, a global hand-off is performed. However, when the same mobile node associates with a different access router within the same local network, a local hand-off is performed. In a local hand-off, the local mobility gateway caches the new care-of address, also known as secondary care-of address, and maps it to the primary care-of address obtained in the above-mentioned global hand-off, i.e. when the mobile node first entered the local network. Thus, in a micro-mobility architecture, the migration of the mobile node is hidden from the rest of the network when it occurs in the local network.

The second crucial delay component is the delay associated with movement detection at the IP layer, i.e. the time period it takes the mobile node to detect that it is no more in the coverage area of the router that is still the serving router for the node (i.e. the router providing connectivity for the node). Different algorithms have been developed for this purpose. In the following, the different movement detection methods are discussed briefly.

In general, movement detection methods may be classified into advertisement based methods and hint based methods. Advertisement based movement detection methods require the above-mentioned agent advertisements to determine the position of the mobile node, while hint based methods rely on so-called hand-off hints, i.e. information communicated from the link layer to the Mobile IP sub-layer when a link layer hand-off is performed.

The advertisement based movement detection methods include methods that are commonly called as Lazy Cell Switching (LCS), Early Cell Switching (EyCS) and Eager Cell Switching (ErCS). In the LCS method, a hand-off is avoided until it is absolutely necessary. Any indication of movement is ignored until contact with the serving router (i.e. agent) is lost for the duration of three advertisement periods. If this happens, the mobile node may attempt to associate itself with a new router. In the EyCS method, the mobile node attempts to associate itself with a new router immediately upon discovering an advertisement from a new router. The ErCS method is similar to the EyCS method, except that hand-offs may not be performed more frequently than once in a second.

In a hint-based movement detection algorithm, also known as Hinted Cell Switching (HCS), the link layer triggers the mobile node to broadcast a router solicitation that in turn forces all adjacent routers to respond with a unicast router advertisement. A drawback of this method is that in environments where a large number of roaming nodes broadcast solicitations the throughput of the respective radio link may drop significantly. To overcome this drawback, an enhanced algorithm known as Fast Hinted Cell Switching (FHCS) determines the identity of the potential router through link layer hints. In this method, the link layer thus provides the MIP layer with information like the IP and MAC addresses of the new router. This mechanism does not need any MIP mechanisms for movement detection or router selection, i.e. the mobile node can bypass the broadcast of the solicitation and proceed directly to the registration phase.

As is obvious from the above discussion, a drawback related to the LCS method is the rather high movement detection delay. However, an advantage of the LCS method is its stable and predictable behavior in overlapping regions where the coverage areas of different routers overlap and where the mobile node may thus receive advertisements from two or more routers.

By means of the EyCS and the ErCS methods the movement detection delay may be considerably reduced. However, these methods suffer from so-called registration oscillations, i.e. in an overlapping region the registration of the mobile node tends to oscillate among the routers involved. Due to the oscillation, data packets are periodically sent through different paths (routers), which may cause severe problems if the end-to-end delays of the different paths are clearly different.

The hint based methods do not suffer from the above drawbacks, since they are independent of router advertisements. Experimental results suggest that the hint based methods significantly improve the hand-off performance as compared to the traditional advertisement based methods. However, the hint based methods incapacitate one uniqueness of the IP, i.e. its transparency to bearer technologies. Furthermore, optimum performance of the hint based methods is limited to homogeneous environments only, where a single access technology plays a dominant role. Unfortunately, future networks do not seem to be developing to that direction. On the contrary, with an increasing number of technologies used for networking, future access networks will most likely be more heterogeneous.

The present invention seeks to eliminate or alleviate the above drawbacks related to MIP hand-offs.

SUMMARY OF THE INVENTION

The present invention seeks to bring about a novel mechanism for selecting a network access entity for a mobile node. Typically, the network access entity is an access router but it may also be another element providing connectivity, if it meets certain requirements discussed below.

In the present invention, which also rests on agent or router advertisements, two time intervals are introduced, which determine the behavior of the movement detection mechanism. First, the mobile node waits for a waiting period, starting from a first reference moment, to see if a new advertisement is received from the serving network access entity within the waiting period. If this is the case, the mobile node remains connected to the serving network access entity, i.e. movement is not detected. However, if a new advertisement does not arrive within the waiting period, the mobile node issues a router solicitation message and starts to measure a solicitation period from a second reference moment. If a response, e.g. a fast router advertisement, arrives from the serving network access entity within the solicitation period, the mobile node decides that it has not yet moved away from the coverage area of the serving network access entity. However, if the fast router advertisement does not arrive within the solicitation period, movement is detected.

Thus one embodiment of the invention is the provision of a method for selecting a serving network access entity for a mobile node in a communication system comprising network access entities broadcasting periodic advertisement messages. The method includes the steps of receiving an advertisement message from a first network access entity currently acting as a serving network access entity for the mobile node, starting measurement of a waiting period from a first reference moment, and issuing a solicitation message when no new advertisement message is received from the first network access entity within the waiting period. The method further includes the steps of initiating, in response to the issuing step, a measurement of a solicitation period from a second reference moment, monitoring whether a response to the solicitation message is received from the first network access entity within the solicitation period; and selecting a serving network access entity for the mobile node based on the monitoring step.

In another embodiment, the invention provides a mobile node for a communication system comprising network access entities broadcasting periodic advertisement messages. The mobile node includes reception means for receiving advertisement messages from network access entities, first timer means, responsive to the reception means, for measuring a waiting period starting from a first reference moment, and triggering means, responsive to the first timer means, for triggering an issuance of a solicitation message when the mobile node fails to receive an advertisement message from a first network access entity within the waiting period, the first network access entity acting as a serving network access entity that provides connectivity for the mobile node. The mobile node further includes second timer means, responsive to the triggering means, for measuring a solicitation period starting from a second reference moment, monitoring means for monitoring if a response is received from the first network access entity within the solicitation period, and selection means, responsive to the monitoring means, for selecting a serving network access entity for the mobile node.

In a still further embodiment, the invention provides a computer usable medium having computer readable program code embodied therein to enable a mobile node to select a serving network access entity in a communication system comprising network access entities broadcasting periodic advertisement messages. The computer readable program code comprises computer readable program code for causing the mobile node to start measurement of a waiting period from a first reference moment with respect to an advertisement message received from a first network access entity acting as a serving network access entity for the mobile node, computer readable program code for causing the mobile node to issue a solicitation message when no new advertisement message is received from the first network access entity within the waiting period, and computer readable program code for causing the mobile node to initiate measurement of a solicitation period from a second reference moment. The computer readable program code further comprises computer readable program code for causing the mobile node to monitor whether a response to the solicitation message is received from the first network access entity within the solicitation period and computer readable program code for causing the mobile node to select a serving network access entity for the mobile node based on the monitoring performed.

The solution of the invention provides a flexible and robust mechanism for movement detection and for selection of a network access entity. Furthermore, the solution of the invention is independent of the bearer technologies and thus also suitable for access networks implemented by heterogeneous access technologies.

In some embodiments of the invention, the length of the waiting period may depend on the application currently communicating through the serving network access entity. In this way, the performance of the method may be adjusted to the service quality requirements of the application in question.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIG. 1 to 5 in the appended drawings, wherein.

DETAILED DESCRIPTION OF THE INVENTION

Figure 1:
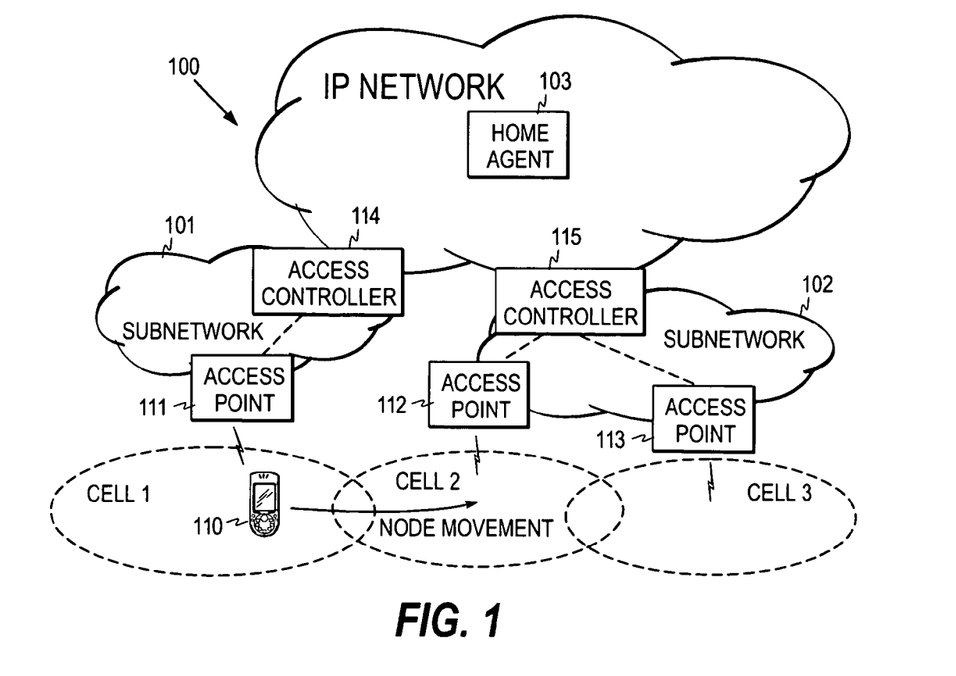
FIG. 1 illustrates IP layer mobility and shows an example of a typical communication environment in which the present invention can be applied.

FIG. 1 shows an example of a typical communication environment in which the present invention can be applied. The environment typically comprises several sub-networks 101 and 102 within an IP network 100, such as the Internet. It is further assumed here that a mobile node 110 is roaming outside its home network, i.e. its current point of attachment to the IP network is in a sub-network that is not its home network. The home agent 103 of the mobile node captures all IP packets sent to the home address of the mobile node, and forwards them to the current IP address of the mobile node, called the care-of address. When the mobile node moves, it registers its current care-of address with the home agent so that the home agent can forward the packets to the mobile node. The above-described micro-mobility architecture may also be utilized to reduce the total number of registrations. In FIG. 1, it is assumed that access points 111 to 113, such as Wireless Local Area Network (WLAN) access points or base stations of cellular networks, offer link layer (layer 2) connectivity only, while access controllers 114 and 115 are IP layer (layer 3) devices offering connectivity at the IP layer. In other words, one access controller may control one or more access points offering link layer connectivity. Examples of access controllers include Access Routers of WLANs, Packet Data Support Nodes (PDSN, also called Packet Data Serving Nodes) of 3GPP2 networks, and Gateway GPRS Support Nodes (GGSN) of 3GPP networks. Notice that there may also be other elements between the different elements shown in FIG. 1.

A device offering link layer connectivity may also be combined with an access controller. The above term "network access entity" covers these implementation alternatives; a network access entity may therefore be an IP layer device connected to an access point or a combined link layer and IP layer device, i.e. an access controller provided with access point functionalities. As the following examples concern a MIP hand-off, the hand-off at the link layer is not discussed in this context. However, the network access entity may also be a link layer device only, if the method of the invention is applicable at the link layer. This is discussed in more detail further below. Notice also that although not shown in the figures, the access points and access controllers may also be mobile elements, such as mobile routers in mobile ad-hoc and mesh networks.

The mobile node may be a laptop, PDA equipment, an intelligent phone or other such mobile terminal. A MIP hand-off occurs when the mobile node moves from one sub-network to another. However, when the mobile node moves within the same sub-network, a link layer hand-off between two access points is not followed by a MIP hand-off. Thus, when mobile node 110 moves from the coverage area of access point 111 (cell 1) to the coverage area of access point 112 (cell 2), a MIP hand-off is performed, i.e. the mobile node registers its new location with the home agent, or with a local mobility gateway if micro-mobility is utilized. However, when the mobile node moves from the coverage area of access point 112 (cell 2) to the coverage area of access point 113 (cell 3), a MIP hand-off is not performed since the two access points are within the same sub-network, i.e. the serving access controller does not change. In the following the mechanism of the invention is discussed assuming that the mobile enters the area where the cells of two sub-networks overlap. It is further assumed here that the access controllers are access routers broadcasting periodic router advertisements.

Figure 2:
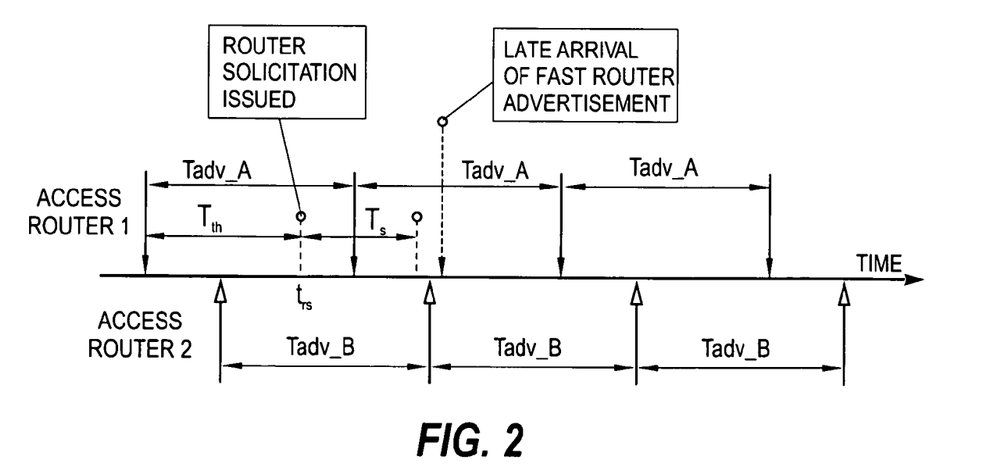
FIG. 2 is a time line illustrating one embodiment of the invention.

FIG. 2 is time line illustrating one embodiment of the movement detection mechanism of the invention. When the mobile node enters the overlapping zone, it receives router advertisements from the serving access router, which is access router 114 in the example of FIG. 1, and from the access router in the new sub-network, i.e. from access router 115. FIG. 2 shows the advertisements broadcast from the serving access router as vertical downward arrows provided with black heads. As shown in the figure, the interval between two consecutive advertisements from the serving access router 114 is Tadv_A. The advertisements broadcast by the new access router 115 are shown as vertical upward arrows provided with white heads. As shown in the figure, the interval between two consecutive advertisements from the new access router is Tadv_B. In the method of the invention, when the mobile node receives an advertisement from the serving access router, it waits for a waiting period denoted with $T_{th}$ in the figure. The value of the waiting period is typically selected to be between zero and Tadv_A. If the mobile node receives an advertisement from the serving access router during the waiting period, it decides to remain connected to the serving access router. However, if no advertisement is received from the serving access router before the waiting period elapses, the mobile node issues a router solicitation. The corresponding moment is denoted with $t_{rs}$ in the figure. Upon issuing the router solicitation the mobile node also starts to measure a time interval, which is termed a solicitation period in this context and denoted with $T_s$ in the figure. If a fast router advertisement arrives from the serving access router before the solicitation period expires, the mobile node decides that it is still within the coverage area of the serving access router (even though it would have received advertisements from a new access router in the meanwhile). The fast router advertisement here refers to a router advertisement that is immediately unicast to the sender of the solicitation. If no fast router advertisement is received before the solicitation period expires, the mobile node decides that it is no more in the coverage area of the serving access router, i.e. movement is detected. Thus, if the fast router advertisement arrives after the solicitation period expires, as shown by a dashed arrow in the figure, movement is detected. Upon detecting movement, the mobile node acquires a new local address, i.e. a care-of address, and starts the registration of the new address. However, the new address is not necessarily registered every time with the home agent, but it may also be registered with a local mobility gateway.

As is obvious from the above, the access controllers advantageously support the fast router advertisement feature.

The mean value $T_{MD\_mean}$ for the movement detection delay may now be presented as: $T_{MD\_mean}=0.5(T_{th}+T_s)$. Assuming that all access controllers support the fast router advertisement feature, the value of $T_s$ may be made very small as compared to the value of $T_{th}$. However, the value of $T_s$ cannot be made smaller than the sum of the propagation time from the mobile node to the access point and the transmission time from the access controller to the mobile node. A typical value of $T_s$ might be, for example, of the order of ten times the average link detection time. Assuming that a typical link detection time is about 10 ms, the value of $T_s$ might be of the order of 100 ms. Typically, the solicitation period may be between 20 ms and 200 ms.

In one embodiment of the invention, the value of $T_{th}$ may be fixed. However, as discussed below, the value of $T_{th}$ may also be application-specific, or the value may be changed in overlapping regions. Although the value of the waiting period is typically selected to be between zero and Tadv, it may also be greater than Tadv (i.e. greater than the mean period between the router advertisements received). For example, the value of $T_{th}$ can be made greater than Tadv if the mobile node is controlled to a hold or standalone state while moving. In this case, the waiting period can be considered as a hold period. However, if the value of $T_{th}$ is made greater than Tadv for some other reason than putting the mobile node on hold, the values of the waiting and solicitation periods are to be carefully considered in order not to detract from the service level experienced by the node. The hold period may also be implemented by temporarily stopping the waiting timer, i.e. the timer measuring the waiting period, from running.

Figure 3:
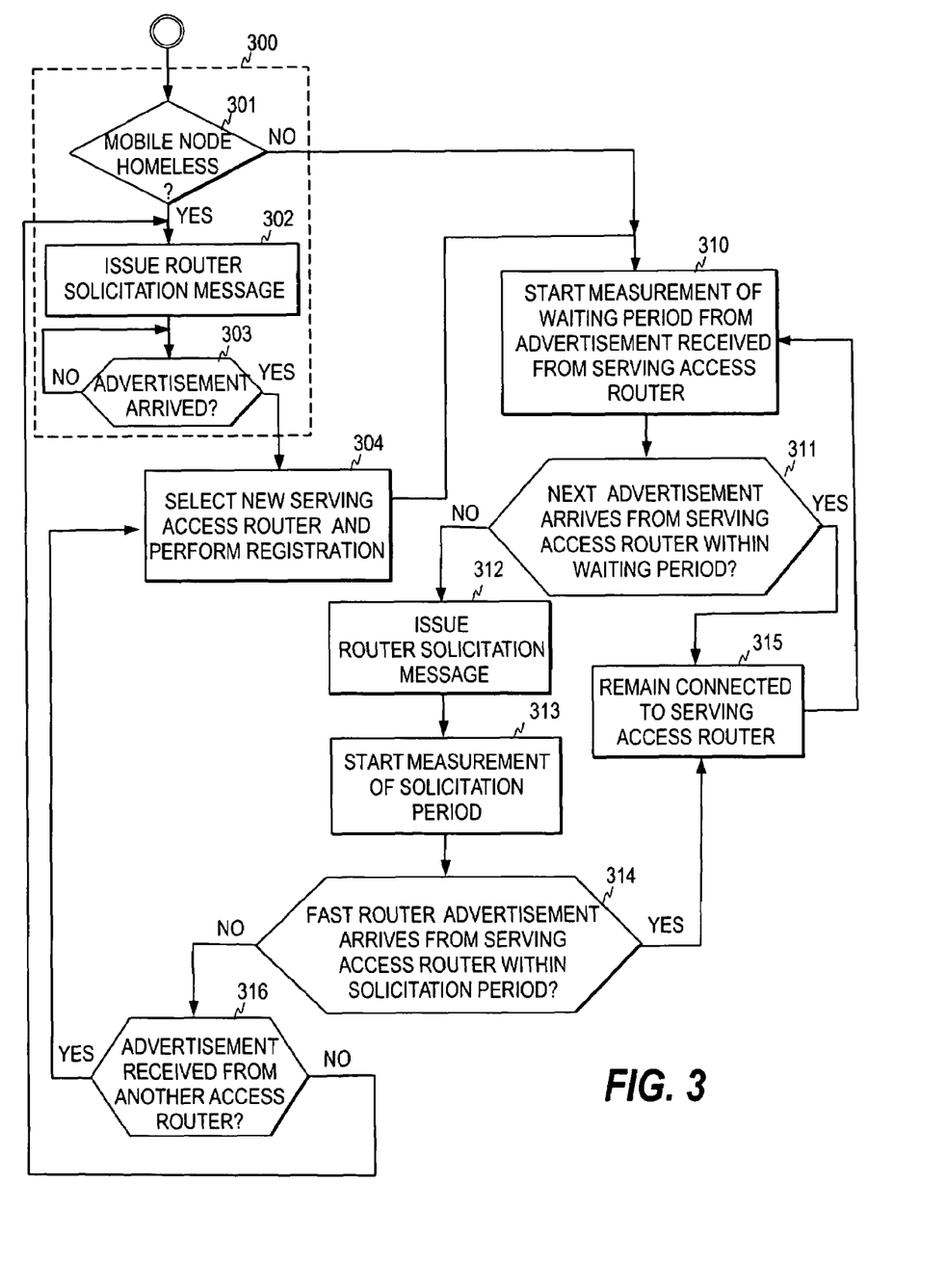
FIG. 3 is a flow chart illustrating one embodiment of the method of the invention.

FIG. 3 is a flow chart illustrating one embodiment of the invention. It is still assumed that the access controllers are access routers. The actual movement detection starts only when the mobile node has a link layer connection to the serving access router. However, FIG. 3 also shows an initial phase 300 during which a homeless mobile node associates itself for the first time with a local network, which may occur, for example, when the mobile node is switched on in a local network, which is not its home network. When the mobile node detects, at step 301, that it has no connection to a serving access router, it may issue a router solicitation (step 302). When an advertisement is received from an access router in the local network, the mobile node selects said access router as its serving access router and registers its new care-of address with the home agent or with a local mobility gateway (steps 303 and 304). The mobile node may also establish the connection to the network by listening to the advertisements broadcast by the neighboring access routers.

When the mobile node has a serving access router, the movement detection of the invention may be started. The movement detection may be continuous or it may be triggered when certain criteria are met, for example when a built-in acceleration transducer detects that the mobile node moves or when the mobile node detects that it is in a high-mobility environment of several access routers. The movement detection of the invention may also be started manually by the user of the mobile node. The mobile node initiates the movement detection by setting a waiting timer to expire at $t=t_r+T_{th}$, where $t_r$ corresponds to the moment of the reception of the latest advertisement from the serving access router (step 310). If the next advertisement from the serving access router arrives within the waiting period, i.e. before the waiting timer expires, the mobile node decides that it has not moved out of the coverage area of the serving access router and remains connected to the serving access router (step 311/yes and step 315).

However, if the mobile node does not receive the next periodic router advertisement from the serving access router before the waiting timer expires, the mobile node issues a router solicitation message (step 312) and sets a solicitation timer (step 313) to expire after the solicitation period $T_s$, i.e. at $t=t_{rs}+T_s$, where $t_{rs}$ corresponds to the moment of issuance of the router solicitation message. If a fast router advertisement arrives from the serving access router before the solicitation timer expires, the mobile node decides that it has not yet moved out of the coverage area of the serving access router and remains connected to the serving access router (step 314/yes and step 315). However, if the mobile node does not receive a fast router advertisement before the solicitation timer expires, the mobile node detects that it is no more in the coverage area of the serving access router. The mobile node then initiates the necessary measures to select a new serving access router. In other words, if a router advertisement is received from one or more neighboring access routers, the mobile node selects one of these access routers as its new serving access router (steps 316 and 304). At step 304, the registration is performed with the home agent or with a local mobility gateway. If no access routers are available, the mobile node is homeless. It may then start to search for an access router by issuing a router solicitation, i.e. the process may jump to step 302. If no access router is available after a certain search period, the user may be informed of the situation.

The movement detection may be continuous or it may be stopped whenever it is not needed. For example, an acceleration transducer may stop the detection if it detects that the mobile node is not moving. The mobile node may also be provided with a user interface through which the user may start or stop the movement detection whenever he or she so desires. The above-mentioned hold state, in which the measurement of the waiting period is halted, may also be activated through the user interface, or the hold state may be activated whenever the mobile node enters power save mode.

In the above embodiments, the mobile node measured the waiting period from an advertisement received from the serving access router. However, the waiting period may be measured from any appropriate reference moment. For example, the measurement of the waiting period may be started when a defined interval has elapsed since the latest advertisement from the serving access router. It is also possible that the waiting period is not contiguous but consists of more than one period separated from each other. This might be the case, for example, when the above-mentioned hold state is activated.

By means of the invention, the robustness of the LCS method may be combined with the shorter movement detection times of the ErCS and EyCS methods. As is obvious from the above, during the waiting and solicitation periods the behavior of the mobile node remains independent of all other advertisements except the advertisements used for registration, which makes the mechanism robust and insensitive to registration oscillations. However, the selection of the length of the waiting period allows the movement detection delay to be shortened.

For improving the adaptability and flexibility of the movement detection, the value of $T_{th}$ may be chosen depending on the type of the application, for example. In this way, the performance of the movement detection method may be adapted to the requirements of the application in question. Real-time applications, such as VoIP or video applications, have different requirements as compared to file transfer, for example.

If an application requires a short movement detection delay, the value of $T_{th}$ may be, correspondingly, small. Applications that have less stringent requirements in terms of the movement detection delay may use a higher value of $T_{th}$ and benefit from the improved robustness. As the invention rests on the router advertisements, it is easily applicable to environments implemented with heterogeneous access technologies.

The solicitation period may also be adjustable, even though it is very short as compared to the length of the waiting period. In one embodiment of the invention, the mobile node may monitor the delays related to the arrivals of the fast router advertisements and adjust the value of the solicitation period, or even the value of the waiting period, accordingly. The monitored delay may thus be utilized to fine-tune the length of the waiting or solicitation period, or the lengths of both periods. The value of the waiting period may have a certain tolerance, which is dependent on the monitored delay or on the solicitation period, which is, in turn, adjusted based on the monitored delay. It is also possible that the solicitation period depends, as can the waiting period, on the application communicating through the currently serving network access entity. For example, when the mobile node arrives in a new network and for some reason cannot receive router advertisements, it may issue a router solicitation and set a set solicitation period whose length depends on the application running.

In another embodiment of the invention, the value of $T_{th}$ may be changed during the movement of the mobile node. For example, the mobile node may control the value of $T_{th}$ so that it remains proportional to the interval between two consecutive advertisements from the serving access router. Thus, if the interval changes when a serving access router is changed, the value of $T_{th}$ may be changed to keep the ratio of the two values constant. The value of $T_{th}$ may also be changed in overlapping regions where the mobile node is able to connect to many access routers.

Figure 4:
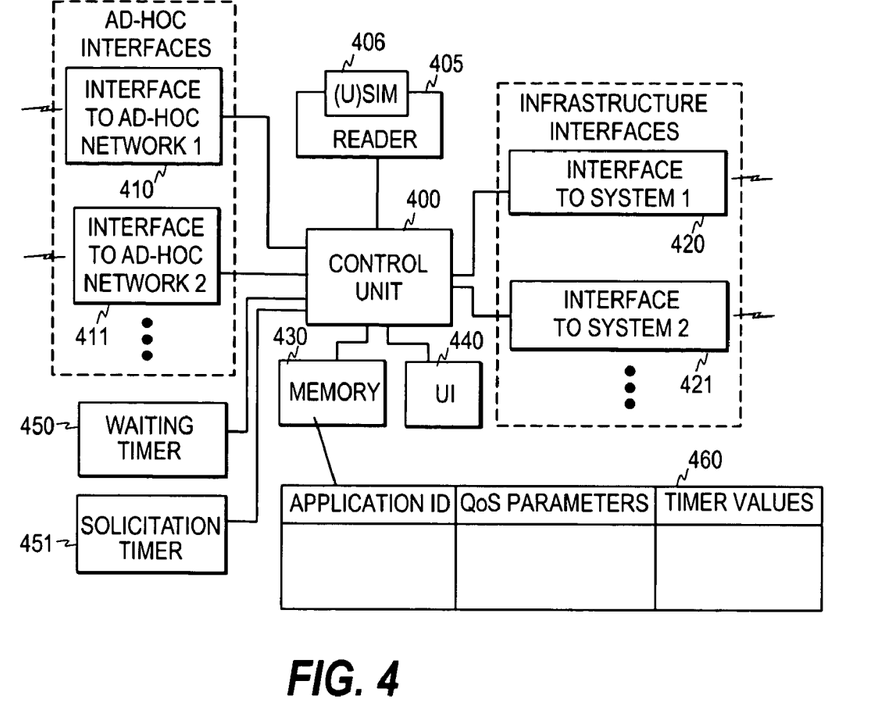
FIG. 4 illustrates the basic elements of a mobile node according to one embodiment of the invention.

FIG. 4 is a schematic presentation of one embodiment of a mobile node according to the invention. The core of the node is a control unit 400, which is connected to various interfaces of the node and to a memory unit 430. The mobile node may be an ad-hoc terminal, for example, in which case the interfaces of the node may be divided into two classes: interfaces for ad-hoc networks and interfaces for the network infrastructure. However, depending on the type of the mobile node, it may be provided with one infrastructure interface only, through which the node communicates with the serving access controllers. In the case of an ad-hoc node, there are thus one or more interfaces 410, 411, each offering the functionality needed to accomplish connectivity to an ad-hoc network of a particular type. Several ad-hoc interfaces are necessary, at least whenever the mobile node acts as a trunk node that serves ad-hoc networks based on different technologies. For example, one ad-hoc network served may be based on WLAN technology, while another one may be based on Bluetooth or Ultra-Wideband (UWB) technology.

The interfaces to the supporting infrastructure include one or more interfaces 420, 421 of which at least one is used to transfer IP traffic through the access controllers.

The node normally also includes a card reader 405 into which an identity module, such as a (Universal Subscriber Module ((U)SIM), User Identity Module (UIM) or a (User) Integrated Circuit Card ((U)ICC) 406 can be inserted. The card reader and the memory unit are connected to the control unit in order that the control unit is able to read data from the identity module and from the memory unit and write data into the identity module and into the memory unit. In addition, the mobile node includes user interface means 440 for using the node. The user interface means typically include a display and a keypad. The control unit further controls timers 450 and 451 measuring the waiting and solicitation periods.

In one embodiment of the mobile node, the memory unit 430 includes a memory area storing application-specific timer values. As the applications, which also reside in the memory unit, typically have different requirements in terms of quality of service (QoS), the memory unit may store the QoS parameters of each application residing in the node. These parameters or the application identities may be mapped to corresponding timer values, i.e. to application-specific values of the waiting and solicitation periods. The control unit then uses, depending on the application that communicates with the network, different timer values. For example; for one application the value of $T_{th}$ may be 0.9 times Tadv_A, while for another application having a more stringent requirement for the delay, the value may be 0.2 or 0.3 times Tadv_A. In the example of FIG. 4, the mapping is performed by means of a table 460, but it may also be performed in another way. For example, the control unit may calculate the timer values based on the parameters associated with the applications.

Instead of the memory unit 430, the values of the waiting and solicitation periods may also be stored in the identity module 405, or the said values may be transferred from the identity module into the memory unit.

The data processing environment of the control unit may resemble that of an ordinary PC, and the client software, including the novel features of the invention, may be delivered separately to the mobile terminal, for example in a multimedia card. It is also possible that the novel features, i.e. the program code that causes the control unit to select an access controller in the above-described manner, are delivered as a plug-in software module to terminals that are provided with conventional client software. Although the plug-in unit may comprise a removable memory card, the plug-in may also be downloaded to the terminal via the network.

The elements shown in connection with FIG. 4 may also be physically separate elements which may be interconnected. For example, the node may be split in a mobile terminal part and a PC part. The PC part may then utilize the mobile terminal as a modem. The above interfaces may be cards connected to the PC part, and the user interface means and the card reader may also be separate elements connectable to the node.

Figure 5:
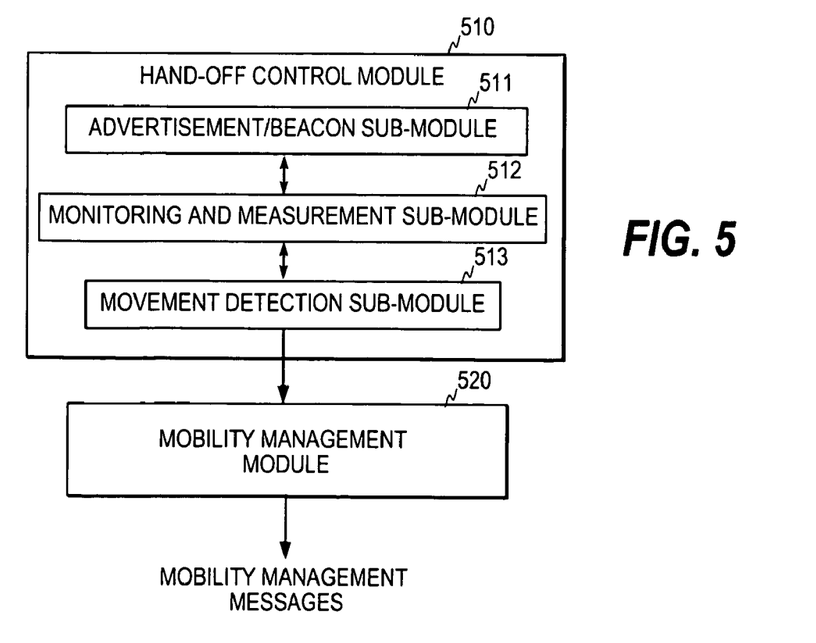
FIG. 5 illustrates one embodiment of the software architecture for implementing the selection of the network access entity in the mobile node.

FIG. 5 illustrates one embodiment of the architecture of the software for implementing the selection of the network access entity in the mobile node. In this embodiment, the functionalities related to the actual mobility management are introduced into a mobility management module 520, while the functionalities related to the control of the hand-off are introduced into a hand-off control module 510. In this way, the implementation details of the mobility management methods may be hidden from the control of the hand-off, and the movement detection state may be managed independently of the mobility management state of the mobile node.

The hand-off control module may further be divided into three sub-modules, which are the advertisement/beacon sub-module 511, the monitoring and measurement sub-module 512 and the movement detection sub-module 513. The monitoring and measurement sub-module performs the actual monitoring and measurement, i.e. it includes the timers measuring the waiting and solicitation periods, while the advertisement/beacon sub-module assists the monitoring and measurement sub-module in acquiring the necessary data for the measurement. The advertisement/beacon module may further select a group of potential network access entities from among which the serving network access entity is selected. These potential network access entities may be chosen based on different factors, such as resource availability and quality of service. Based on the measurement results, the movement detection sub-module 513 then makes the decision whether the mobile node should change the serving network access entity or not, and advises the mobility management module accordingly.

The mobility management module 520 is thus responsible for the actual execution of the hand-offs. This module thus handles the actual registration of the current address of the mobile node. As the underlying access technologies may vary, the module selects the transport protocol to be used in each case and manages session hand-off in order to enable seamless roaming in the network. The mobility management module may include a separate adaptor sub-module, which integrates the hand-off control module with the mobility management module and controls the hand-off execution process.

Although the invention was described above with reference to the examples shown in the appended drawings, it is obvious that the invention is not limited to these, but may be modified by those skilled in the art without departing from the scope and spirit of the invention. For example, the mechanism may be implemented in any environment in which the access controllers broadcast advertisements or other similar messages and in which the mobile node may transmit a message to which the access controller responds substantially without delay. The access controllers may thus be any elements operating in this way and providing connectivity, and the router solicitation message and the fast router advertisement may be replaced by any messages allowing the mobile node to quickly test whether it is still within the coverage area of the serving access controller. It is therefore to be understood that even though the advertisement and solicitation messages are terms related to the above-described environment, they are also general terms which may cover messages with similar functionalities. For example, if mobile nodes and access points broadcasting beacon messages and providing link layer connectivity are able to exchange messages similar to the router solicitation and fast router advertisement, the method of the invention may be used to select a link layer access point too. Furthermore, although the router solicitation message is according to current standards a broadcast message, it (or a corresponding message sent by the mobile node) could also be a unicast message to the serving access node, in which case the bandwidth usage would be more efficient.

The invention claimed is:

1. A method, comprising:
   receiving a first advertisement message from a first network access entity currently acting as a serving network access entity for a mobile node;
   in response to the received first advertisement message, starting measurement of a waiting period;
   issuing a solicitation message when no new advertisement message is received from the first network access entity during the waiting period, wherein the solicitation message is configured to trigger sending of a response in the first network access entity;
   initiating measurement of a solicitation period when the solicitation message is issued;
   monitoring whether the response to the solicitation message is received from the first network access entity during the solicitation period; and
   selecting a serving network access entity for the mobile node based on the monitoring.

2. The method according to claim 1, further comprising preserving the first network access entity as the serving network access entity if a new advertisement message is received from the first network access entity during the waiting period.

3. The method according to claim 2, wherein the selecting includes preserving the first network access entity as the serving network access entity if the response is received from the first network access entity during the solicitation period.

4. The method according to claim 3, further comprising receiving a second advertisement message from a second network access entity.

5. The method according to claim 4, further comprising selecting the second network access entity as the serving network access entity if the mobile node fails to receive the response from the first network access entity during the solicitation period.

6. The method according to claim 1, wherein the initiating includes initiating the measurement of the solicitation period during the issuing.

7. The method according to claim 1, further comprising controlling a length of the waiting period.

8. The method according to claim 7, wherein the controlling is performed in dependence on an application communicating through the serving network access entity, the application residing in the mobile node.

9. The method according to claim 7, wherein the waiting period is controllable between zero and an upper limit which is no more than a fixed value that substantially corresponds to a period between two consecutive advertisement messages broadcast by the serving network access entity.

10. The method according to claim 1, further comprising controlling a length of the solicitation period.

11. The method according to claim 1, wherein the solicitation period is substantially shorter than the waiting period.

12. The method according to claim 1, wherein the mobile node is assigned a network address enabling traffic to be routed through the serving network access entity to the mobile node, the method further comprising updating the network address in response to the selecting.

13. The method according to claim 1, further comprising transferring the mobile node to a hold state by stopping the measurement of the waiting period.

14. The method according to claim 13, further comprising transferring the mobile node from the hold state to a measurement state by allowing the measurement of the waiting period to continue.

15. A mobile node comprising:
reception means for receiving advertisement messages from network access entities;
first timer means, responsive to the reception means, for measuring a waiting period starting from a first reference moment;
triggering means, responsive to the first timer means, for triggering an issuance of a solicitation message when the mobile node fails to receive an advertisement message from a first network access entity during the waiting period, the first network access entity acting as a serving network access entity that provides connectivity for the mobile node, wherein the solicitation message is configured to trigger sending of a response in the first network access entity;
second timer means, responsive to the triggering means, for initiating measurement of a solicitation period when the solicitation message is issued, the measurement starting from a second reference moment;
monitoring means for monitoring whether the response is received from the first network access entity during the solicitation period; and
selection means, responsive to the monitoring means, for selecting a serving network access entity for the mobile node.

16. The mobile node according to claim 15, wherein the first timer means is configured to measure from the first reference moment, and wherein the first reference moment substantially corresponds to a moment of reception of the advertisement message from the first network access entity.

17. The mobile node according to claim 15, wherein the second timer means is configured to measure from the second reference moment, and wherein the second reference moment substantially corresponds to a moment of the issuance of the solicitation message.

18. The mobile node according to claim 15, wherein the selection means is configured to preserve the first network access entity as the serving network access entity if the advertisement message is received from the first network access entity during the waiting period.

19. The mobile node according to claim 18, wherein the selection means is further configured to preserve the first network access entity as the serving network access entity if the response is received from the first network access entity during the solicitation period.

20. The mobile node according to claim 19, wherein the selection means is further configured to select a second network access entity as the serving network access entity if the mobile node fails to receive the response from the first network access entity during the solicitation period, the second network access entity comprising a network access entity from which the mobile node is currently receiving advertisement messages.

21. The mobile node according to claim 15, wherein the mobile node further comprises first controlling means for controlling a length of the waiting period.

22. The mobile node according to claim 21, wherein the first controlling means is configured to control the length of the waiting period in dependence on an application communicating through the serving network access entity, the application residing in the mobile node.

23. The mobile node according to claim 22, wherein the mobile node comprises a data repository for storing application-specific information indicating the length of the waiting period.

24. The mobile node according to claim 23, wherein the data repository is in a module removable from the mobile node.

25. The mobile node according to claim 15, wherein the mobile node further comprises second controlling means for controlling a length of the solicitation period.

26. A computer readable medium encoded with a computer program to enable a mobile node to select a serving network access entity in a communication system, the computer program comprising:
a first computer readable program code portion for causing the mobile node to start measurement of a waiting period from a first reference moment with respect to an advertisement message received from a first network access entity acting as a serving network access entity for the mobile node;
a second computer readable program code portion for causing the mobile node to issue a solicitation message when no new advertisement message is received from the first network access entity within the waiting period, the solicitation message being configured to trigger sending of a response in the first network entity;
a third computer readable program code portion for causing the mobile node to initiate measurement of a solicitation period when the solicitation message is issued, the measurement starting from a second reference moment;
a fourth computer readable program code portion for causing the mobile node to monitor whether the response to the solicitation message is received from the first network access entity during the solicitation period; and
a fifth computer readable program code portion for causing the mobile node to select a serving network access entity for the mobile node based on the monitoring performed.

27. The computer usable medium according to claim 26, wherein the first, second, third, fourth, and fifth computer readable program code portions are stored in a memory card insertable into the mobile node.

28. The computer usable medium according to claim 26, wherein the first, second, third, fourth, and fifth computer readable program code portions are stored in the mobile node.

29. A mobile node, comprising:
a receiver configured to receive advertisement messages from network access entities;
a first timer, responsive to the receiver, configured to measure a waiting period starting from a first reference moment;
a first controller, responsive to the first timer, configured to trigger an issuance of a solicitation message if the mobile node fails to receive an advertisement message from a first network access entity during the waiting period, the first network access entity being configured to act as a serving network access entity that provides connectivity for the mobile node, wherein the solicitation message is configured to trigger sending of a response in the first network access entity;
a second timer, responsive to the first controller, configured to initiate measurement of a solicitation period when the solicitation message is issued, the measurement starting from a second reference moment;

a second controller configured to monitor whether the response is received from the first network access entity during the solicitation period; and a third controller, responsive to the second controller, configured to select a serving network access entity for the mobile node.

30. The mobile node according to claim 29, wherein the first timer is configured to measure from the first reference moment, and wherein the first reference moment substantially corresponds to a moment of reception of the advertisement message from the first network access entity.

31. The mobile node according to claim 29, wherein the second timer is configured to measure from the second reference moment, and wherein the second reference moment substantially corresponds to a moment of the issuance of the solicitation message.

32. The mobile node according to claim 29, wherein the third controller is configured to preserve the first network access entity as the serving network access entity if the advertisement message is received from the first network access entity during the waiting period.

33. The mobile node according to claim 29, wherein the third controller is further configured to preserve the first network access entity as the serving network access entity if the response is received from the first network access entity during the solicitation period.

34. The mobile node according to claim 33, wherein the third controller is further configured to select a second network access entity as the serving network access entity if the mobile node fails to receive the response from the first network access entity during the solicitation period, the second network access entity comprising a network access entity from which the mobile node is currently receiving advertisement messages.

35. The mobile node according to claim 29, wherein the mobile node further comprises fourth controller configured to control a length of the waiting period.

36. The mobile node according to claim 35, wherein the first controlling means is configured to control the length of the waiting period in dependence on an application communicating through the serving network access entity, the application residing in the mobile node.

37. The mobile node according to claim 36, wherein the mobile node comprises a data repository for storing application-specific information indicating the length of the waiting period.

38. The mobile node according to claim 37, wherein the data repository is in a module removable from the mobile node.

39. The mobile node according to claim 29, wherein the mobile node further comprises a fifth controller configured to control a length of the solicitation period.

* * * * *